No. 818,643. PATENTED APR. 24, 1906.
C. SCHOCK.
MEASURING VESSEL.
APPLICATION FILED JULY 30, 1904.
3 SHEETS—SHEET 2.
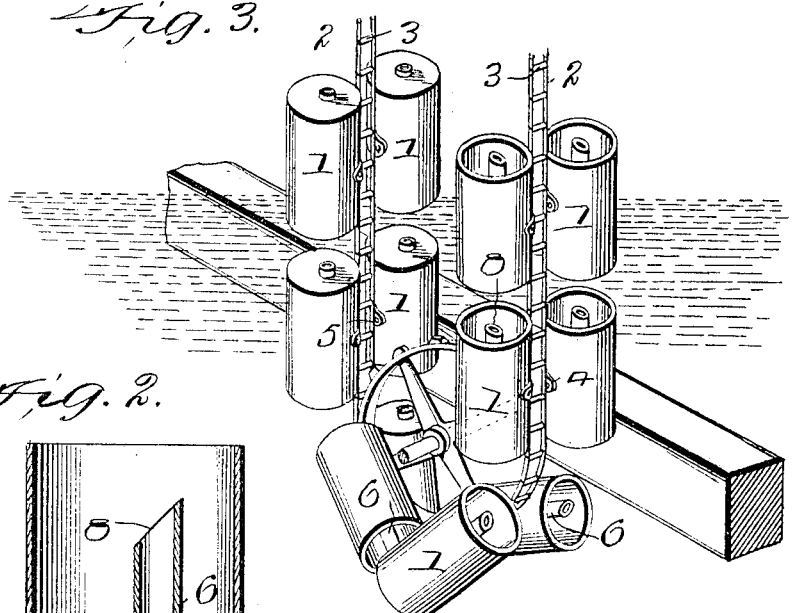
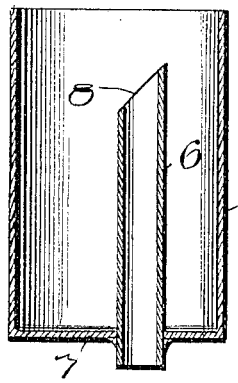
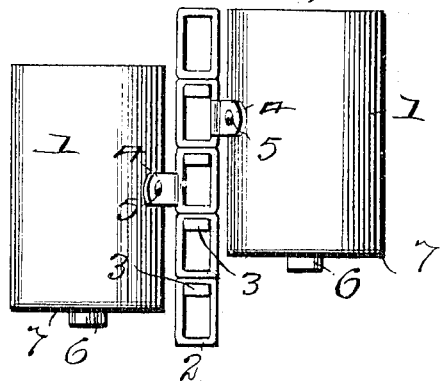
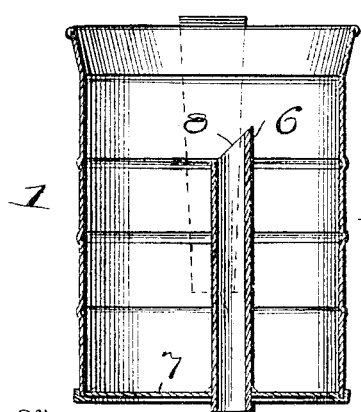
Inventor
Clarence Schock.
Witnesses No. 818,643. PATENTED APR. 24, 1906.
C. SCHOCK.
MEASURING VESSEL.
APPLICATION FILED JULY 30, 1904.
3 SHEETS—SHEET 3.
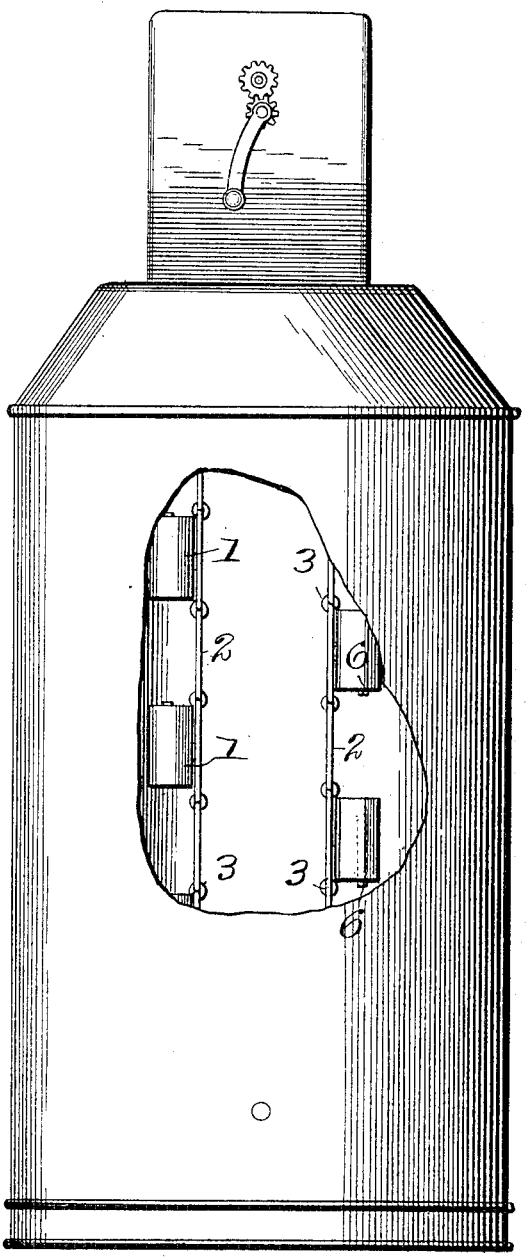
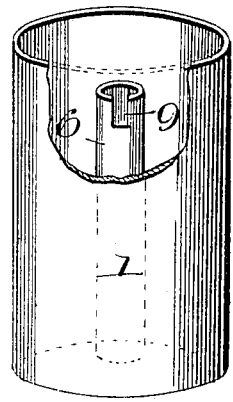
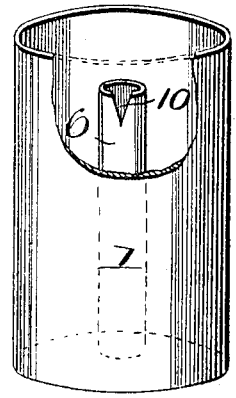
Witnesses
Inventor
Clarence Schock

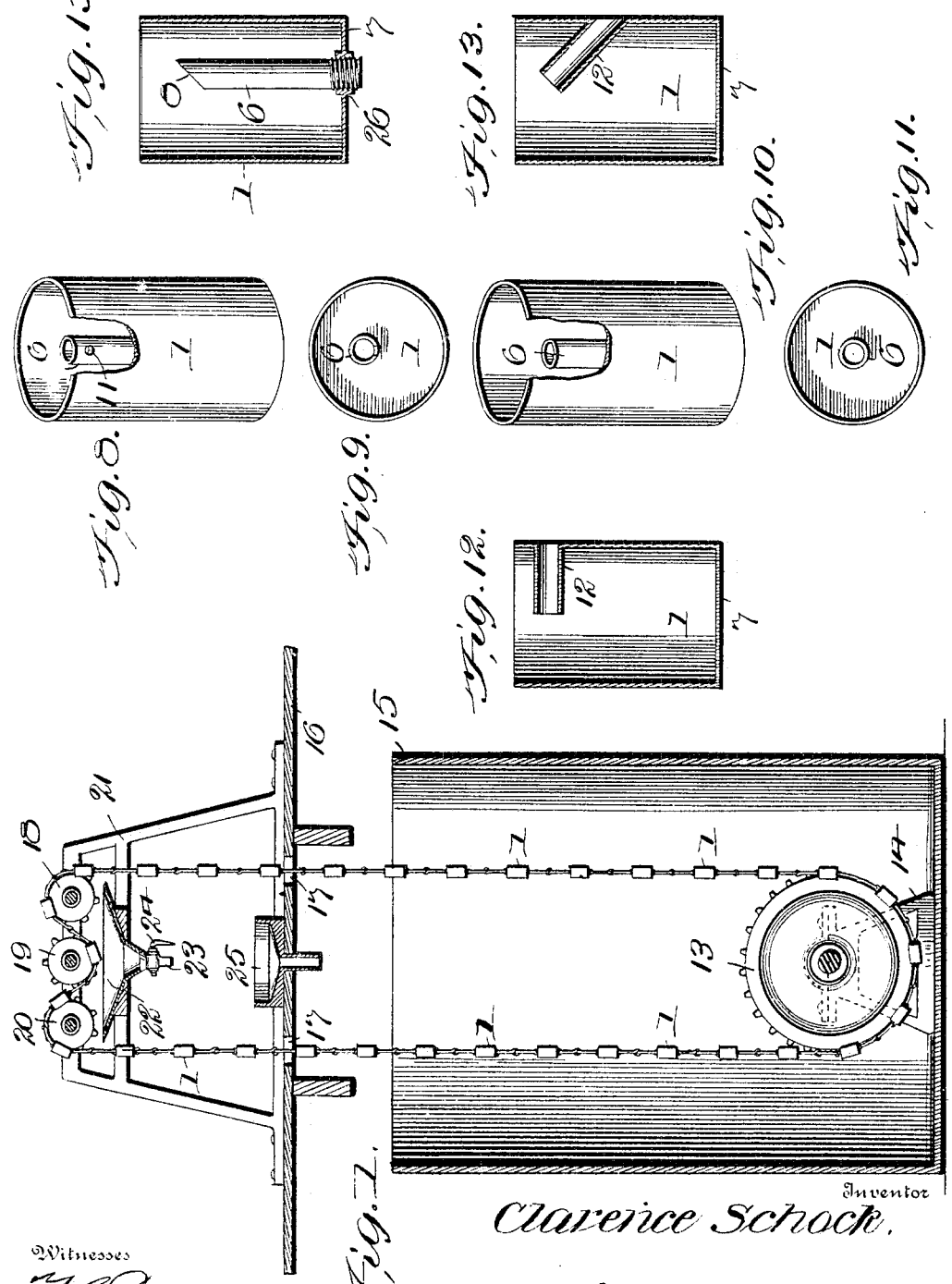

UNITED STATES PATENT OFFICE.

CLARENCE SCHOCK, OF MOUNT JOY, PENNSYLVANIA.

MEASURING VESSEL.

No. 818,643.  Specification of Letters Patent.  Patented April 24, 1906.

Application filed July 30, 1904. Serial No. 218,922.

*To all whom it may concern:*

Be it known that I, CLARENCE SCHOCK, a citizen of the United States, residing at Mount Joy, in the county of Lancaster and State of Pennsylvania, have invented certain new and useful Improvements in Measuring Vessels; and I do hereby declare the following to be a full, clear, and exact description of the invention, such as will enable others skilled in the art to which it appertains to make and use the same.

My invention relates to measuring vessels, and more particularly to a measuring-machine for delivering any desired quantity of liquid, my machine being adapted for a great variety of uses, although especially designed for discharging from a tank or other storage-receptacle an accurately determined or measured quantity of its liquid contents, as oil, &c.

The prime object of my invention among others is to provide a simple though reliably-efficient measuring appliance of the character specified which may be graduated with great accuracy, whereby the exact quantity desired will be delivered without loss or waste, a further object being to provide suitable coöperating mechanism which will combine a plurality of my improved measuring vessels and bring them continuously and successively into a discharging position.

Other objects and advantages will be made apparent from the following specification, considered in connection with the accompanying drawings, in which—

Figure 1 shows a side elevation of my measuring-machine complete, parts thereof being shown in section. Fig. 2 shows a longitudinal sectional view of the preferred form of measuring vessel or unit. Fig. 3 shows one form of supporting means for the lower end of the sprocket-chain employed to carry a plurality of my measuring units. Fig. 4 is a detail view in section of the sprocket-chain with two of the measuring vessels attached thereto. Fig. 5 shows a simple form of portable tank which may be employed in coöperation with a plurality of my measuring vessels attached to a sprocket-chain properly mounted in position. Figs. 6 and 7 show overflow-tubes, each having a different form of intake or drain point. Fig. 8 represents a vertical overflow-tube with a simple opening or aperture in one side to determine the quantity retained by the measuring vessel. Fig. 9 is a top plan view of Fig. 8. Fig. 10 is a perspective detail view representing the vertical overflow-tube centrally located, the center of the tube being the true center of the measuring vessel, the upper end of the tube being cut off perfectly square. Fig. 11 shows a top plan view of Fig. 10, illustrating the central location of the drain-tube. Fig. 12 represents the overflow-tube of my measuring vessel extending out laterally or in a horizontal plane through the side of the vessel, the inlet of the tube being centrally located relative to the measuring vessel and at a predetermined height from the bottom thereof. Fig. 13 represents the overflow-tube as being obliquely disposed relative to the axial plane of the measuring vessel, the inlet of the drain-tube being centrally located at a predetermined height. Fig. 14 shows one form of my drain-tube applied to a measuring vessel adapted to be manually employed. Fig. 15 shows the drain-tube adjustably seated.

It will therefore be understood that a grouping of a plurality of my measuring vessels may be accomplished, each having a drain-tube of proper height and location, whereby the intake-point of the drain-tube will be in the exact center of the vessel, excepting where that form of construction shown in Figs. 10 and 11 is employed, in which case the drain-tube will be concentric relative to the walls of the measuring vessel, or an ordinary manually-employed measuring vessel may be fitted with my measuring-tubes by any preferred form of drain-tube, as shown in Fig. 14. For the purposes of this application I will illustrate means for mounting a plurality of measuring units or vessels upon a suitable carrying-chain, though it will be understood that the means herein illustrated and described of accomplishing this result are merely representative of a great variety of ways the same result may be accomplished, and in like manner while for all ordinary practical purposes the location of the drain-tube concentric with the walls of the measuring vessels will be found practically accurate, yet for draining the excess of liquid in the measuring vessel so that only the true unit of measure will be left therein it is desirable that the lowest intake or inlet point leading to the drain-tube shall be in the exact center of the measuring vessel, and it will therefore be observed that I have located a drain-tube mainly to one side of the central portion of the measuring vessel, leaving only one longitudinal section of the wall of the drain-tube in the exact center of the vessel and forming in said centrally-located section a suitable form of intaking aperture or recess, the lowest point of which is in line with the axis of the measuring vessel. In Figs. 12 and 13, however, the drain-tube is located wholly different from the manner above described, inasmuch as the surplus quantity of liquid is allowed to pass out at the side of the vessel, the drain-tube in this instance being located horizontally or obliquely. Where a plurality of measuring vessels is utilized, they may be connected to the sprocket-chain in any suitable manner which will not impair the flexibility of the carrying-chain and will therefore permit it to pass freely around the carrying sprocket-wheels, whereby the measuring vessels will be grouped together in an endless series and may be caused to take into the liquid within the storage vessel, and thereby become filled and moved upward to the discharging-point.

Referring in detail to the drawings, 1 designates the body portion of my measuring vessel, which may be of any preferred size and of any desired shape deemed most suitable for the purpose, and this cup-like body, it will be understood, may be multiplied in number as desired, the vessels being preferably arranged in pairs and properly connected together in any preferred way, as by means of an endless carrier, as a sprocket-chain each link 2 of which has an integral hook-like extension 3 at one end adapted to engage the contiguous end of the next adjacent link, as is common with this form of sprocket-chain.

The individual link designed to carry one of the measuring vessels may be provided with any suitable device to connect it to said vessel, as an apertured plate or ear 4, which may be permanently attached to a contiguous part of the measuring vessel, as by a suitable rivet 5.

The body portion 1 of my measuring vessel carries a drain-tube 6, which, as shown in Fig. 2 and other views, is rigidly connected to the bottom 7, preferably extending slightly below the same and upward to a point near the top of the vessel, the upper end of the drain-tube being variously shaped, as shown in the different views—as, for instance, in Fig. 2 it will be observed that the top of the drain-tube 6 is obliquely severed, as indicated by the numeral 8.

As before briefly stated, the drain-tube 6 is located so that one wall thereof will be in the exact center of the measuring vessel, and I therefore provide that the lowest point or intake of said tube shall also be in the true center of the vessel. I will therefore call attention to Figs. 6 and 7, wherein it will be observed that the drain-tube 6 may be provided with different forms of recess.

In Fig. 6 a recess 9 is provided, the walls of the recess being parallel with the axis of the drain-tube, while the bottom of the recess is at right angles to said axis. In Fig. 7, however, I have formed a V-shaped recess 10 in the drain-tube, both of said recesses being directly in the centrally-located wall of the tube.

In Fig. 8 a simple form of aperture 11 is provided near the top of the drain-tube, thus disposing the lowest part of the intake of the drain-tube in the exact center of the measuring vessel, notwithstanding that the drain-tube itself is disposed to one side of said central point, as shown in Fig. 9.

In Fig. 12 the drain-tube (designated by the numeral 12) is horizontally disposed, and this tube corresponds to the drain-tube 6 shown in previously-described views. It will be observed, however, that the drain-tube 12 has its lowest intake-point directly in the center of the measuring vessel, and it may be stated in this connection that the object of placing the drain-point in the true center of the vessel is to provide for the retention of the same quantity or exact unit of measure in the measuring vessel without regard to whether the vessel is held in a level position or tilted from side to side incident to the use thereof, inasmuch as no painstaking care is exacted from the operator either when using my measuring vessel manually or as part of a measuring-machine.

In Fig. 13 the drain-tube 12 is obliquely disposed, as before explained; but the intake-point of said tube is located in the true center of the measuring vessel, and it is obvious that the height of the lowest part of the intake of all the different forms of discharge-tubes which I have provided determines the true quantity of liquid left within the measuring vessel.

In Figs. 10 and 11 the drain-tube 6 is cut squarely off at its upper end; but the entire tube is located in a true center of the vessel, and for ordinary practical purposes this form of construction will be amply sufficient to meet all requirements.

I prefer in all cases to so form the measuring vessel that the walls thereof will extend above the drain-tube or higher up than is actually required to hold the true unit of measure, thereby providing against casual loss of the contents of the vessel, as by dashing over the sides, and requiring no special care in operating or adjusting the carrying devices employed to assemble and actuate the measuring vessels. It is obvious that the unit of any desired denomination or measure is contained within the vessel between a horizontal plane intersecting the lowest edge of the drain-point and the bottom of the vessel, all excess being discharged through the drain-tube before the vessel has been elevated or moved to a discharging-point, thereby insuring perfectly accurate and automatic measurement, it being understood that the lowest drain-point is located in that side of the drain-tube which is always disposed exactly in the center of the vessel. It may also be stated in this connection that the great advantage of the drain-tube whether beveled or provided with any other form of intake is due to the fact that when the measuring-cup is first filled the entire capacity of the tube is utilized for draining off the surplus liquid until the level of the liquid goes down sufficiently to leave what is approximately the unit of measure.

As the drainage continues it is of course reduced in volume until finally the level of the liquid goes down to the lowest drain-point, thus graduating to an exact nicety what shall be left within the vessel, which quantity is the predetermined quantity which shall be delivered by the measuring vessel. The lowest drain-point—as, for instance, the lowest point of the beveled edge of the tube—being centrally located, as before explained, limits the retaining capacity of the measuring-cup practically the same whether the latter stands level or is tilted from side to side.

The foregoing statement regarding the utilization of the full capacity of the drain-tube is correct without regard to the form or shape of the upper end of the drain-tube or whether said tube shall be beveled or provided with a V-shaped notch or with a simple intaking-aperture located so that the lowest edge of the intake shall be intersected by a plane lying on the surface of the liquid when reduced in quantity to constitute the exact unit of measure.

In Fig. 1 I have shown a plurality of my measuring vessels grouped together or disposed upon the endless carrier, as a sprocket-chain before described, the said chain passing around a sprocket-wheel 13, mounted in suitable bearings or standards 14, said standards serving as weights to keep said sprocket-chain normally taut and are shown in this instance as resting upon the bottom of the receptacle 15 for oil or the like and located—as, for instance, in the cellar—below the floor 16. However, said standards may be suspended above the floor of the tank and the lower end of the chain and sprocket left free to swing, from the fact that any movement of said parts will not affect the measuring of the fluid. The sprocket-chain extends upward through openings 17 in the floor and into engagement with the sprocket-wheels 18, 19, and 20, properly mounted in suitable bearings in the framework 21 or equivalent thereof. The sprocket-wheel 19 is so located that it will act upon the sprocket-chain between the wheels 18 and 20 and dispose the series of measuring vessels in such position that they will promptly discharge their contents into the receiver 22, said receiver having a discharging-nozzle 23 and a suitable faucet or valve 24. It is obvious that the crank or other suitable controlling device may be attached to the shafts of the sprocket-wheels 18 or 20, so that the endless carrier-chain may be moved as desired to bring the measuring vessels over the guiding sprocket-wheel 18 and thence direct said vessels down under the sprocket-wheel 19, emptying the contents into the receiver or pan 22, located directly below said sprocket 19, and the liquid thus delivered into said receiver 22 may be readily delivered into a can or other vessel, while the waste or drip will pass down into the drip-pan 25 and thence back into the storage tank or receptacle 15. This construction of course admits of the edge of the vertical section of the chain to be incased by a suitable tubing of sheet metal or other form of casing, at the same time affording sufficient space between the two casings for the vertical sections of the sprocket-chain to permit a can or other vessel to be properly placed to receive the discharge from the nozzle 23.

It will be seen from the foregoing description, considered in connection with the accompanying drawings, that I have illustrated a variety of modified forms of construction which may be adopted in carrying out or materializing my invention, and while I have described the preferred construction and some of the possible modifications thereof I desire to comprehend in this application all substantial equivalents and substitutes, the essential feature of my invention being the location of the drain-point centrally to the measuring vessel.

It is furthermore obvious that while my invention is especially applicable for use in connection with a plurality of measuring vessels properly grouped together or mounted in position so that they may be driven successively into the supply-tank and from thence to the discharge-point, yet my invention will also be found to be useful and desirable in connection with a simple form of measuring vessel, as an ordinary quart-cup or the like.

In Fig. 5 I have illustrated how the measuring vessels may be attached to the carrier-chain singly or in one continuous row instead of being carried in pairs, as illustrated in Figs. 1, 3, and 4. Where the double or twin measuring construction is used, both sides of the sprocket-chain are left free to be connected to a measuring vessel, thus allowing the sprocket-wheel to pass between the pairs of measuring vessels and whereby the measuring capacity is greatly multiplied.

In Fig. 5 it will be observed that the drain-tube is adjustably seated in the bottom of the measuring vessel, whereby one side of the tube will be disposed in the center of said vessel. This adjustability of the drain-tube is accomplished by providing a threaded seat 26 and exteriorly threading the lower end of the drain-tube, whereby it will be received by said seat, and it is obvious that by a proper rotation of the drain-tube the upper end thereof may be readily adjusted or disposed at a predetermined point, which will leave the lowest point of the intake of the tube at the exact point relative to the measuring vessel, which will insure that the true unit of measure will be left in said vessel without regard to whether the measuring vessel is held in a true upright position or tilted from side to side.

It is obvious that any form of intake may be provided for the upper end of the drain-tube, and said tube may be rigidly secured in position or adjustably mounted as may be deemed most desirable in practice.

Having thus fully described my invention, what I claim as new, and desire to secure by Letters Patent, is—

1. A measuring vessel having a drain-tube, the edge of the inlet of which is at varying distances from the bottom of the vessel and that portion of said edge nearest the bottom of the vessel being at all times in line with the axis of the vessel.

2. A measuring vessel having a drain-tube rigidly mounted therein, the edge of the inlet of said tube being at varying distances from the bottom of the vessel, and that portion of said edge nearest the bottom of the vessel being at all times in line with the axis of the vessel.

3. A measuring vessel having a rigid drain-tube therein of less length than the sides of the vessel, the edge of the inlet of said tube being at varying distances from the bottom of the vessel and that portion of said edge nearest the bottom of the vessel being at all times in line with the axis of the vessel.

4. The combination with a measuring vessel; of a discharge-tube therein having its inlet end obliquely cut away, that portion of said end nearest the bottom of the vessel being at all times in line with the axis of the vessel.

5. A measuring vessel having a drain-tube adjustably mounted therein, the edge of the inlet of said tube being at varying distances from the bottom of the vessel, that portion of said edge nearest the bottom being at all times in line with the axis of the vessel.

6. In a measuring vessel, the combination with the body portion having a threaded opening in its bottom, of a discharge-tube adapted to fit in said threaded opening and disposed parallel with the sides of the measuring vessel and having its upper end obliquely cut away whereby the position of the lower side of said obliquely-severed end will determine the quantity of contents in the measuring vessel, the position of the discharge-point of the tube being varied by rotating the discharge-tube.

7. The combination with an elevator; of a measuring vessel connected thereto and having an overflow-tube, the edge of the inlet of said tube being at all times intersected by the longitudinal axis of the vessel.

8. The combination with an elevator; of a measuring vessel connected thereto and having an overflow-tube rigidly mounted therein, the edge of the inlet of said tube being at all times intersected by the longitudinal axis of the vessel.

9. The combination with an elevator; of a measuring vessel connected thereto and having a rigid overflow-tube adjustably mounted therein, the edge of the inlet of said tube being at all times intersected by the longitudinal axis of the vessel.

10. The combination with an elevator; of a measuring vessel movably connected thereto and having an overflow-tube, the inlet of which is at all times intersected by the longitudinal axis of the vessel.

11. The combination with a suitable support; of a measuring vessel connected thereto and adapted to swing thereon, said vessel having an overflow-tube, the edge of the inlet of which is at all times intersected by the longitudinal axis of the vessel.

12. The combination with a suitable support; of a measuring vessel connected thereto and adapted to swing thereon, said vessel having an overflow-tube rigidly mounted therein, the edge of the inlet of said tube being at all times intersected by the longitudinal axis of the vessel.

In testimony whereof I have signed my name to this specification in the presence of two subscribing witnesses.

CLARENCE SCHOCK.

Witnesses:
HENRY M. STAUFFER,
CORA LEIB.